United States Patent
Gerstenberger et al.

(10) Patent No.: US 8,233,920 B2
(45) Date of Patent: Jul. 31, 2012

(54) ANGLE OF ARRIVAL DOWNLINK SIGNALING

(75) Inventors: Dirk Gerstenberger, Stockholm (SE); Ari Kangas, Lidingö (SE); Daniel Larsson, Solna (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 12/465,931

(22) Filed: May 14, 2009

(65) Prior Publication Data

US 2010/0240392 A1 Sep. 23, 2010

Related U.S. Application Data

(60) Provisional application No. 61/160,813, filed on Mar. 17, 2009.

(51) Int. Cl.
*H04W 24/00* (2009.01)
*H04M 3/42* (2006.01)

(52) U.S. Cl. .......... 455/456.5; 455/414.1
(58) Field of Classification Search .......... 455/456.1, 455/456.2, 456.3, 456.5, 456.6, 414.1, 414.2
See application file for complete search history.

(56) References Cited

U.S. PATENT DOCUMENTS

| | | | |
|---|---|---|---|
| 8,000,701 B2 * | 8/2011 | Dawson | 455/433 |
| 2002/0089949 A1 * | 7/2002 | Bjelland et al. | 370/331 |
| 2005/0136942 A1 * | 6/2005 | Timiri et al. | 455/456.1 |
| 2005/0153687 A1 | 7/2005 | Niemenmaa et al. | |
| 2005/0255857 A1 * | 11/2005 | Kim et al. | 455/456.1 |
| 2006/0033746 A1 * | 2/2006 | Ogura | 345/570 |
| 2006/0046747 A1 * | 3/2006 | Abraham et al. | 455/456.6 |
| 2006/0063536 A1 | 3/2006 | Kim et al. | |
| 2006/0194594 A1 | 8/2006 | Ruutu et al. | |
| 2007/0275732 A1 * | 11/2007 | Jethwa et al. | 455/456.1 |
| 2007/0293239 A1 | 12/2007 | Dawson et al. | |
| 2008/0064380 A1 * | 3/2008 | Niemenmaa et al. | 455/414.2 |
| 2009/0176496 A1 * | 7/2009 | Li et al. | 455/437 |
| 2011/0171969 A1 * | 7/2011 | Halivaara et al. | 455/456.1 |

* cited by examiner

*Primary Examiner* — Chrisopher M Brandt
(74) *Attorney, Agent, or Firm* — Coats & Bennett, PLLC

(57) ABSTRACT

A wireless communication network determines positioning data for a given mobile terminal, in response to receiving a positioning event trigger for that mobile terminal. The network sends the positioning data to the mobile terminal via control-plane signaling, for transfer by the mobile terminal to the user plane. Correspondingly, the mobile terminal receives the positioning data over the control plane, transfers it to the user plane, and transmits the positioning data or location information derived from the positioning data, via user-plane signaling. As such, network-performed positioning measurements and/or geographic coordinate data derived therefrom are transferred from the control plane, to the user plane, for flexible and transparent transmission from the mobile terminal to a given node having a user-plane connection with the mobile terminal. Such a node may be essentially any type of communication device, system, or server, internal or external to the network.

35 Claims, 10 Drawing Sheets

ANGLE OF ARRIVAL DOWNLINK SIGNALING

RELATED APPLICATIONS

The present application claims priority under 35 U.S.C. §119 from the U.S. provisional patent application filed on 17 Mar. 2009 and assigned App. No. 61/160,813, which is incorporated herein in its entirety.

FIELD OF THE INVENTION

The present invention relates to Long Term Evolution (LTE) cellular systems and their associated standards—see the Third Generation Partnership Project (3GPP)—and particularly relates to transferring network-generated positioning data for a mobile terminal from the control plane to the user plane, for use in user-plane location services.

BACKGROUND

Location based services are today becoming more and more important for the cellular industry. The major driving force is emergency positioning, denoted E-911 positioning in North America. The accuracy requirements for E-911 positioning are quite stringent, which has lead to a technical solution with Assisted Global Positioning System (A-GPS) as the main positioning method. One or several fallback positioning methods are also normally implemented to cover up where A-GPS works less well, e.g., indoors. Common such methods include cell ID positioning, timing advance (TA) positioning, fingerprinting positioning as well as time difference of arrival methods in the uplink and downlink. These methods are reviewed below. Currently, with the emergence of A-GPS capable cell phones, commercial applications are expected to emerge at a larger scale. Such applications include e.g., personal navigation, friend and service finding, and gaming applications.

A-GPS Positioning

A-GPS positioning is an enhancement of GPS. An example of an A-GPS based positioning system is displayed in FIG. 1, such as might be implemented in a Wideband Code Division Multiple Access (WCDMA) system. In such systems, GPS reference receivers attached to a cellular communication system collect assistance data that, when transmitted to GPS receivers in terminals connected to the cellular communication system, enhance the performance of the GPS terminal receivers. Typically, A-GPS accuracy can become as good as 10 meters without differential operation. The accuracy becomes worse in dense urban areas and indoors, where the sensitivity is most often not high enough for detection of the very weak signals from the GPS satellites.

Cell ID Positioning

The cell ID positioning method determines the terminal location with cell granularity, by association of the cell ID to a geographical description of the cell. Standardization may not be finalized in LTE, however in WCDMA a polygon with 3-15 corners is used for this purpose.

TA Positioning

The TA positioning principle is depicted in FIG. 2. Briefly, the travel time of radio waves from the "eNodeB," which is a type of cellular radio base station, to the terminal is measured. The distance from the eNodeB to the terminal can then be computed $$r = c\frac{TA}{2}$$

where TA is the timing advance value and where c is the speed of light.

The TA measurement alone defines a circle, or if the inaccuracy is accounted for, a circular strip around the eNodeB. By combining this information with the cell description, left and right angles of the circular strip can be computed. In particular, FIG. 2 illustrates cell identity positioning combined with TA, where the terminal position is determined as the intersection of the serving cell and the circular strip.

Fingerprinting Positioning

Another approach is provided by so called fingerprinting positioning. Fingerprinting positioning algorithms operate by creating a radio fingerprint for each point of a fine coordinate grid that covers the Radio Access Network (RAN). The fingerprint may e.g. consist of: the cell IDs that are detected by the terminal, in each grid point; quantized path loss or signal strength measurements, with respect to multiple eNodeBs, performed by the terminal, in each grid point—note that an associated ID of the RBS may also be needed; quantized TA, in each grid point—note that an associated ID of the eNodeB may also be needed; and radio connection information, like the radio access bearer (RAB).

Whenever a position request arrives to the positioning method, a radio fingerprint is first measured, after which the corresponding grid point is looked up and reported. This of course requires that the point is unique.

The database of fingerprinted positions (the radio map) can be generated in several ways. A first alternative would be to perform an extensive surveying operation that performs fingerprinting radio measurements repeatedly for all coordinate grid points of the RAN. The disadvantages of this approach include: the surveying required becomes substantial for small cellular networks; and the radio fingerprints are in some instances (e.g. signal strength and path loss) sensitive to the orientation of the terminal, a fact that is particularly troublesome for handheld terminals. For fine grids, the accuracies of the fingerprinted positions therefore become highly uncertain. This is unfortunately seldom reflected in the accuracy of the reported geographical result.

Another approach is to replace the fine grid by high precision position measurements of opportunity, and to provide fingerprinting radio measurements for said points. This avoids the above drawbacks, however algorithms for clustering of high precision position measurements of opportunity needs to be defined, and algorithms for computation of geographical descriptions of the clusters also need to be defined. These two problems are solved by previous patent applications on the "adaptive enhanced cell identity" (AECID) positioning method.

Time Difference of Arrival and Trilateration

The time difference of arrival (TDOA) method relies on measurements, typically on some pilot radio signal, from multiple base stations. The measurement is performed by means of correlation with the known signals of the base stations measured upon. The situation is depicted in FIG. 3.

Assuming that the measurements are successful for a number of cells, three of which are depicted in FIG. 3, the following relations between the measured TOAs in the terminal, the transmission times from the base stations (eNodeBs) and the distances between the terminals and the base stations follow:

$$t_{TOA,1} + b_{clock} = T_1 + \|r_1 - r_{Terminal}\|/c$$
$$\vdots$$
$$t_{TOA,n} + b_{clock} = T_n + \|r_n - r_{Terminal}\|/c.$$

Here $t_{TOA,i}$, i=1, ..., n denotes the measured time of arrivals (TOAs) in the terminal, $T_i$, i=1, ..., n denotes the transmission times from the eNodeBs and c is the speed of light. The boldface quantities are the (vector) locations of the base stations and the terminal. $b_{clock}$ denotes the unknown clock bias of the terminal with respect to cellular system time. Now, in TDOA positioning, time of arrival differences with respect to the own site are formed according to $$t_{TDOA,2} = t_{TOA,2} - t_{TOA,1} = T_2 - T_1 + \frac{\|r_2 - r_{Terminal}\|}{c} - \frac{\|r_1 - r_{Terminal}\|}{c}$$
$$\vdots$$
$$t_{TDOA,n} = t_{TOA,n} - t_{TOA,1} = T_n - T_1 + \frac{\|r_n - r_{Terminal}\|}{c} - \frac{\|r_1 - r_{Terminal}\|}{c}.$$

In these n−1 equations, the left hand sides are known (with some additional measurement error), provided that the time of transmission differences (denoted the real time differences) can be measured. Further the locations of the base stations, $r_i$, i=1, ..., n, can be surveyed to within a few meters and thus are known as well. What remains unknown is the terminal location, i.e., $$r_{Terminal} = (x_{Terminal} y_{Terminal} z_{Terminal})^T.$$

In the more common case, a two dimensional positioning is performed and the unknown position is instead expressed as $$r_{Terminal} = (x_{Terminal} y_{Terminal})^T.$$

It then follows that at least three time of arrival differences are needed in order to find a 3D terminal position and that at least two time of arrival differences are needed in order to find a 2D terminal position. This, in turn, means that at least four sites need to be detected for 3D terminal positioning and at least three sites need to be detected for 2D terminal positioning. In practice, accuracy can be improved if more measurements are collected and a maximum likelihood solution is introduced. There may also be multiple (false) solutions in cases where only a minimum number of sites are detected.

Angle of Arrival Positioning

Angle of arrival positioning exploits multiple antenna elements to measure the angle of arrival of radio waves impinging on said array. In the uplink it is easy to understand that angle of arrivals measured in non-colocated sites are needed to compute a position in the plane. This makes pure angle of arrival positioning a multi-cell technology, a fact that increases the complexity and cost of implementation significantly. Further, in rural regions base station geometry may not allow measurement in multiple eNodeBs.

Hence a base station may combine AoA with TA, in one cell. Since AoA and TA are essentially orthogonal direction-wise in the terminal position, the accuracy of such a method should be good, at least in situations where radio propagation is good, without too much multipath and non line of sight effects. This should be the case, for example, in rural areas without hills. The principle is depicted in FIG. 4.

Architectural Considerations—Single Cell vs. Multiple Cells

In LTE systems, eNodeBs communicate with each other over the X2 interface, and with terminals over the RRC interface; see FIG. 5, depicting an LTE RAN architecture. As for AoA positioning using uplink measurements, this means that signaling will be needed over X2 in the case of pure AoA positioning, whereas the combination with TA does not require this. It is however possible to combine AoAs from multiple base stations with TA as well.

Architectural_Considerations—Control Plane vs. User Plane

Positioning can be performed either over the control plane (CP) or the user plane (UP). In the first case, measurements performed in the UE need to be signaled over the RRC interface to the eNodeB, for further transfer to the positioning node. AoA (uplink) positioning does not require any signaling because AoA measurements are performed in the eNodeBs and because TA is available in the serving eNode as well.

User plane positioning is entirely different because, with user plane positioning, the terminal communicates directly with a positioning node external to the RAN, using communication that is transparent to the eNodeB. The current trend is towards more user plane positioning. For example, certain network operators, such as VERIZON, prefer use plane positioning for LTE.

SUMMARY

A wireless communication network determines positioning data for a given mobile terminal, in response to receiving a positioning event trigger for that mobile terminal. The network sends the positioning data to the mobile terminal via control-plane signaling, for transfer by the mobile terminal to the user plane. Correspondingly, the mobile terminal receives the positioning data over the control plane, transfers it to the user plane, and transmits the positioning data (or location information derived from the positioning data) via user-plane signaling. As such, network-performed positioning measurements and/or geographic coordinate data derived therefrom are transferred from the control plane, to the user plane, for flexible and transparent transmission from the mobile terminal to a given node having a user-plane connection with the mobile terminal. Such as node may be essentially any type of communication device, system, or server, internal or external to the network.

Thus, in one or more embodiments, a base station is configured to support a user-plane location service at a mobile terminal, where the base station comprises one or more processing circuits that are configured to receive a positioning request at the base station, triggered by a location request event associated with the user-plane location service, and to determine positioning data for the mobile terminal. For example, the positioning circuits may be determined to calculate the positioning data based on angle-of-arrival measurements made at one or more base stations for uplink signals from the mobile terminal, and on corresponding base station location information. The one or more processing circuits are further configured to transmit the positioning data from the base station to the mobile terminal via control-plane signaling, to support the user-plane location service at the mobile terminal.

Correspondingly, in one or more embodiments, a mobile terminal is configured to carry out a user-plane location service, where the mobile terminal comprises a communication transceiver configured to receive positioning data via control-plane signaling from a supporting wireless communication network, where the positioning data is determined by the wireless communication network for the mobile terminal. Further, the mobile terminal includes one or more processing circuits operatively associated with the communication transceiver. These processing circuits are configured to transfer the positioning data from a control-plane function of the mobile terminal to a user-plane function of the mobile terminal, and transmit the positioning data or derived location information from the mobile terminal to the wireless communication network via user-plane signaling, for supporting the user-plane location service.

In the context of a Long Term Evolution (LTE) network, base station, and mobile terminal, the invention as disclosed in this document enables, for example, the use of uplink angle-of-arrival (AoA) positioning determination in a user-plane application. Particularly, angle-of-arrival (AoA) positioning over the user plane is enabled by signaling uplink AoA measurements from an eNodeB to a mobile terminal over the LTE RRC interface, and then having the mobile terminal transfer that information to the user plane, for user-plane signaling from the mobile terminal.

Broadly, then, this document discloses a method and apparatus wherein a mobile terminal or other user equipment (UE) receives in the downlink (DL), via control-plane signaling, data at least relating to UE position. Correspondingly, the UE transmits in the uplink (UL), via user-plane signaling, information that at least enables the UE position to be determined. The positioning data received by the UE from the network via control-plane signaling on the DL may be the computed position of the UE, or may be data sufficient to compute the UE's position. Similarly, the information correspondingly transmitted by the UE via UL signaling over the user plane may be the UE's computed position, or may be data sufficient to compute the UE's position. That is, the UE may transfer to the user plane whatever positioning data it received from the network over the control plane, or it may process or add to that data, for subsequent transmission by the UE on the user plane.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
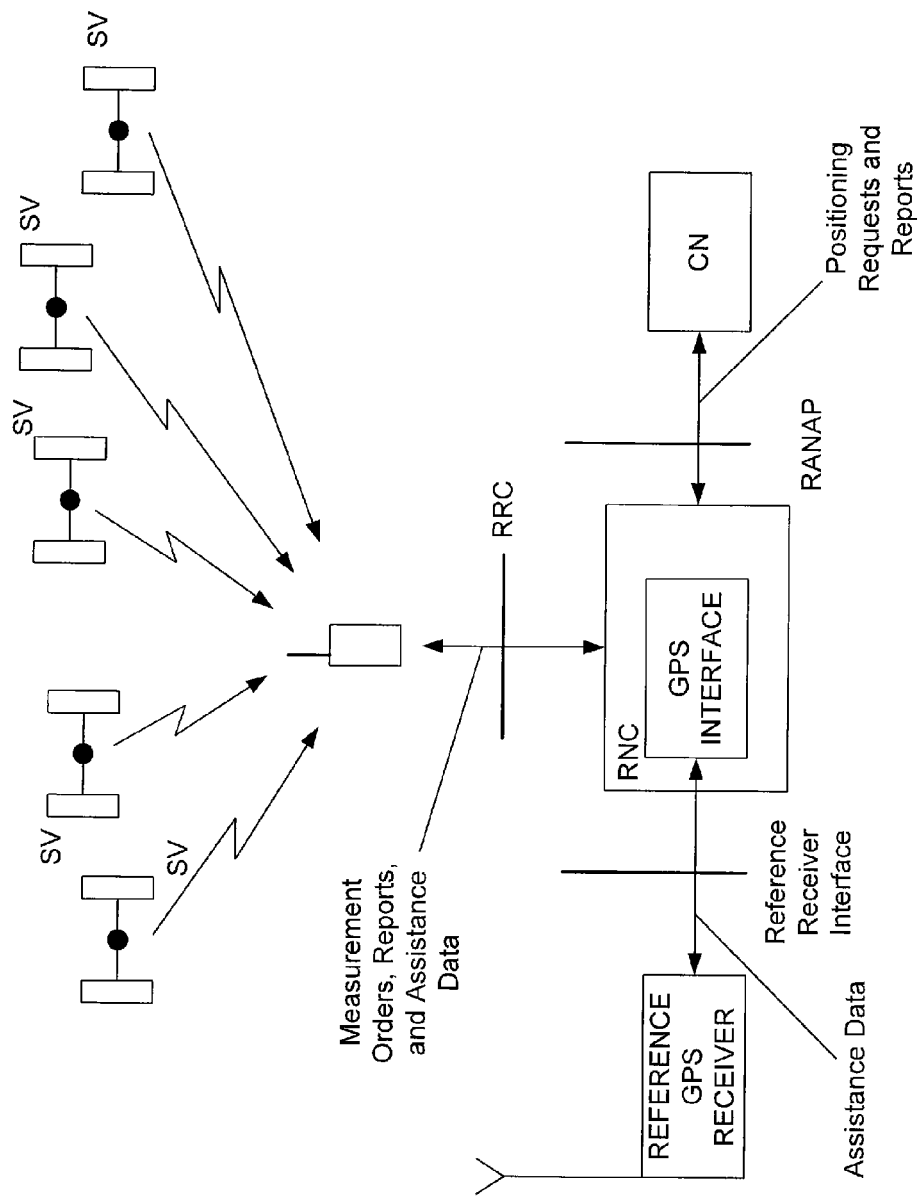
FIG. 1 a known example of A-GPS implemented in a cellular communication system, such as a WCDMA system.
Figure 2:
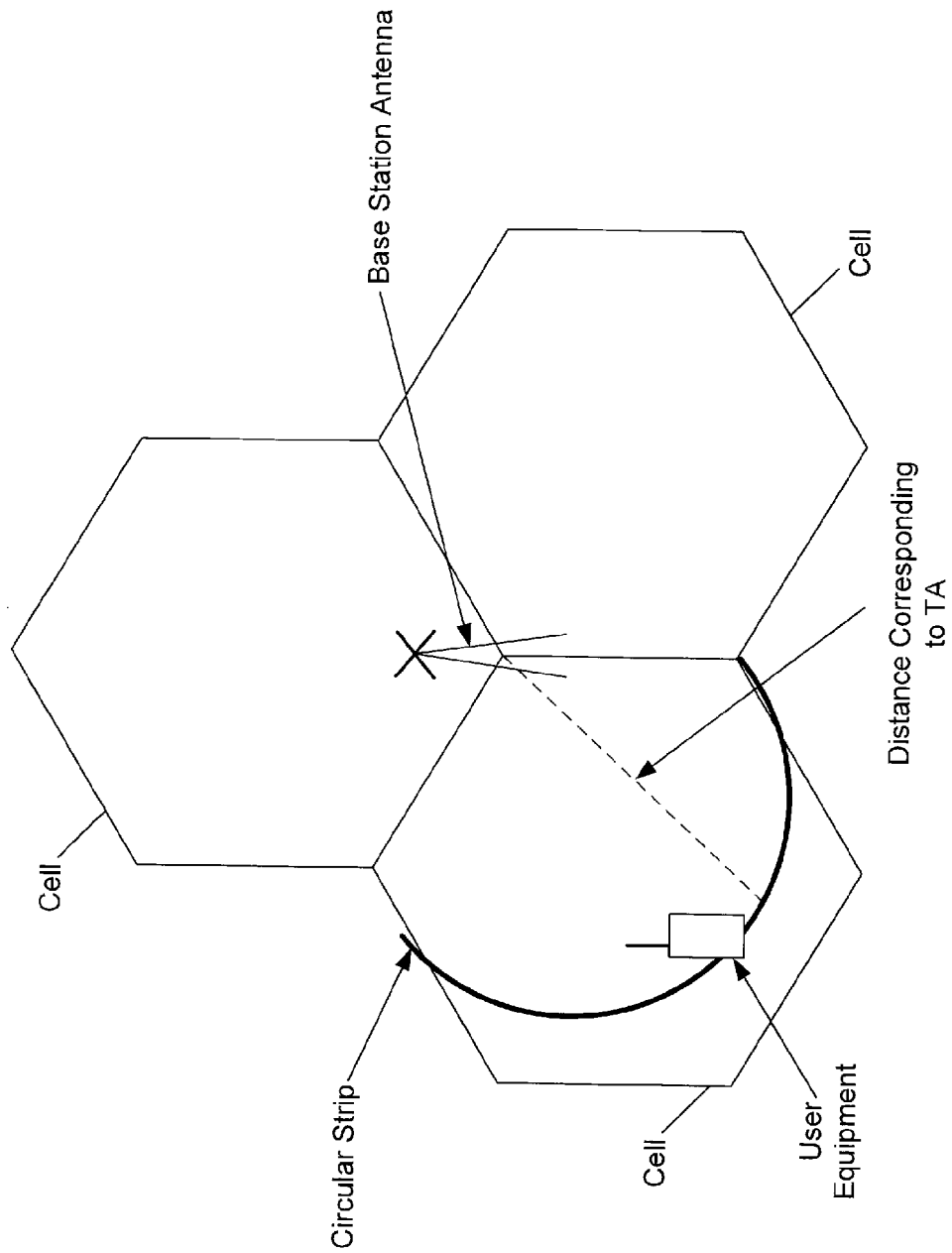
FIG. 2 is a known example of cell identity positioning combined with TA.
Figure 3:
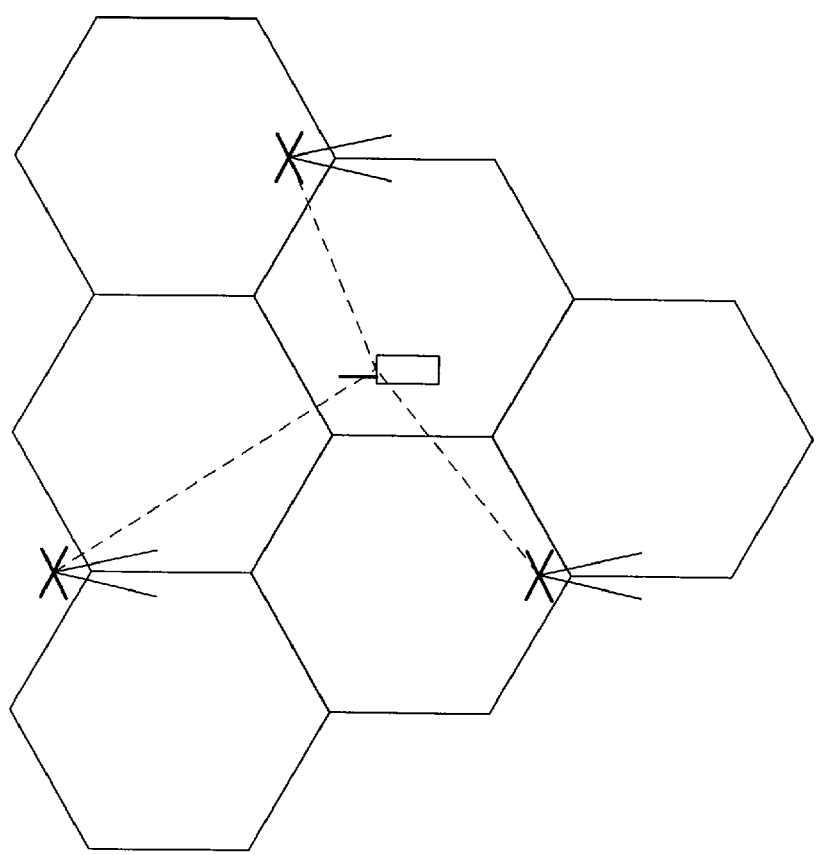
FIG. 3 is a known example of multiple base stations, as relates to TDOA positioning methods.
Figure 4:
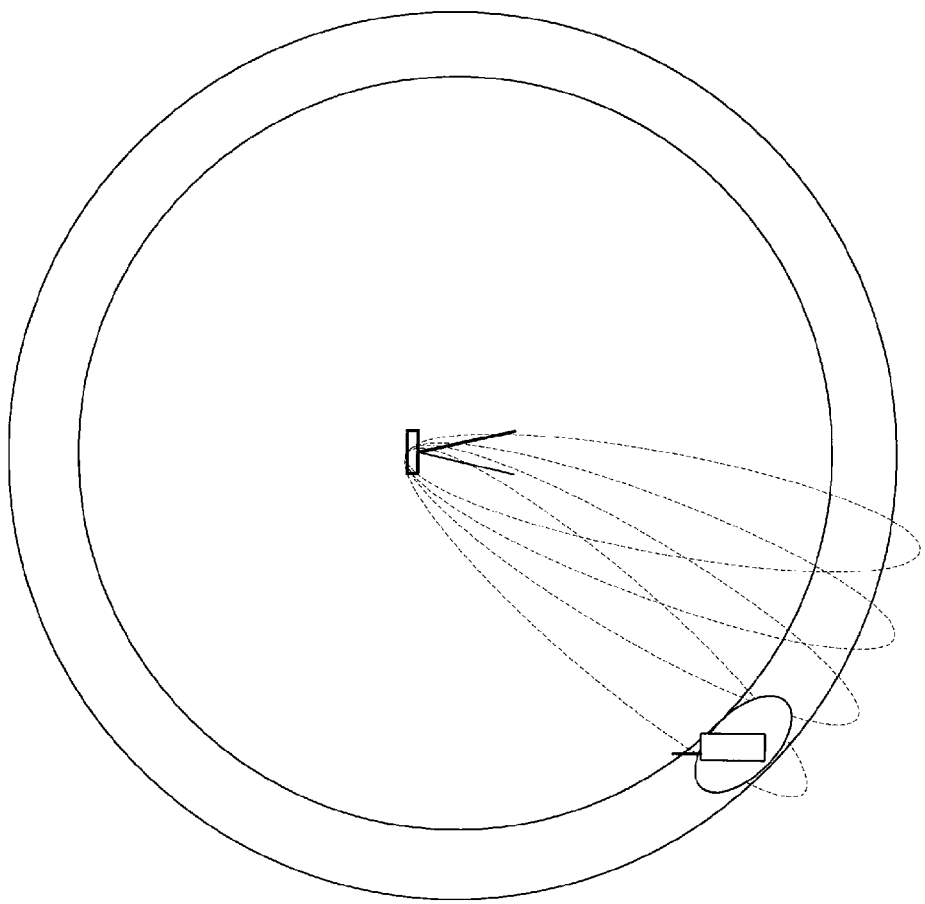
FIG. 4 is a known example of the fusion of TA and AoA in a single cell.
Figure 5:
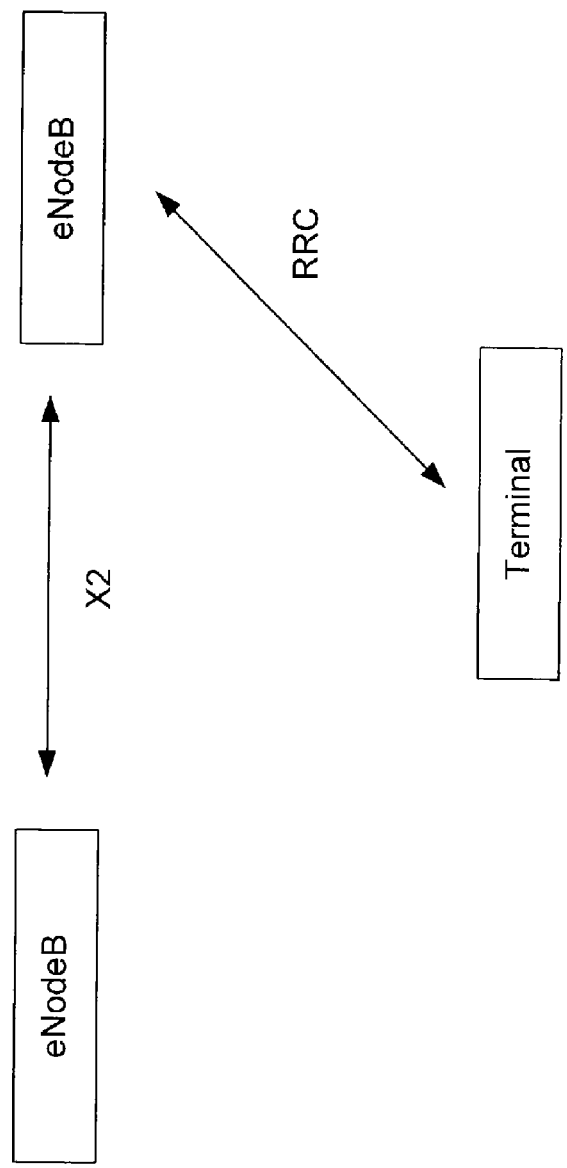
FIG. 5 is a known example of an LTE RAN architecture.
Figure 6:
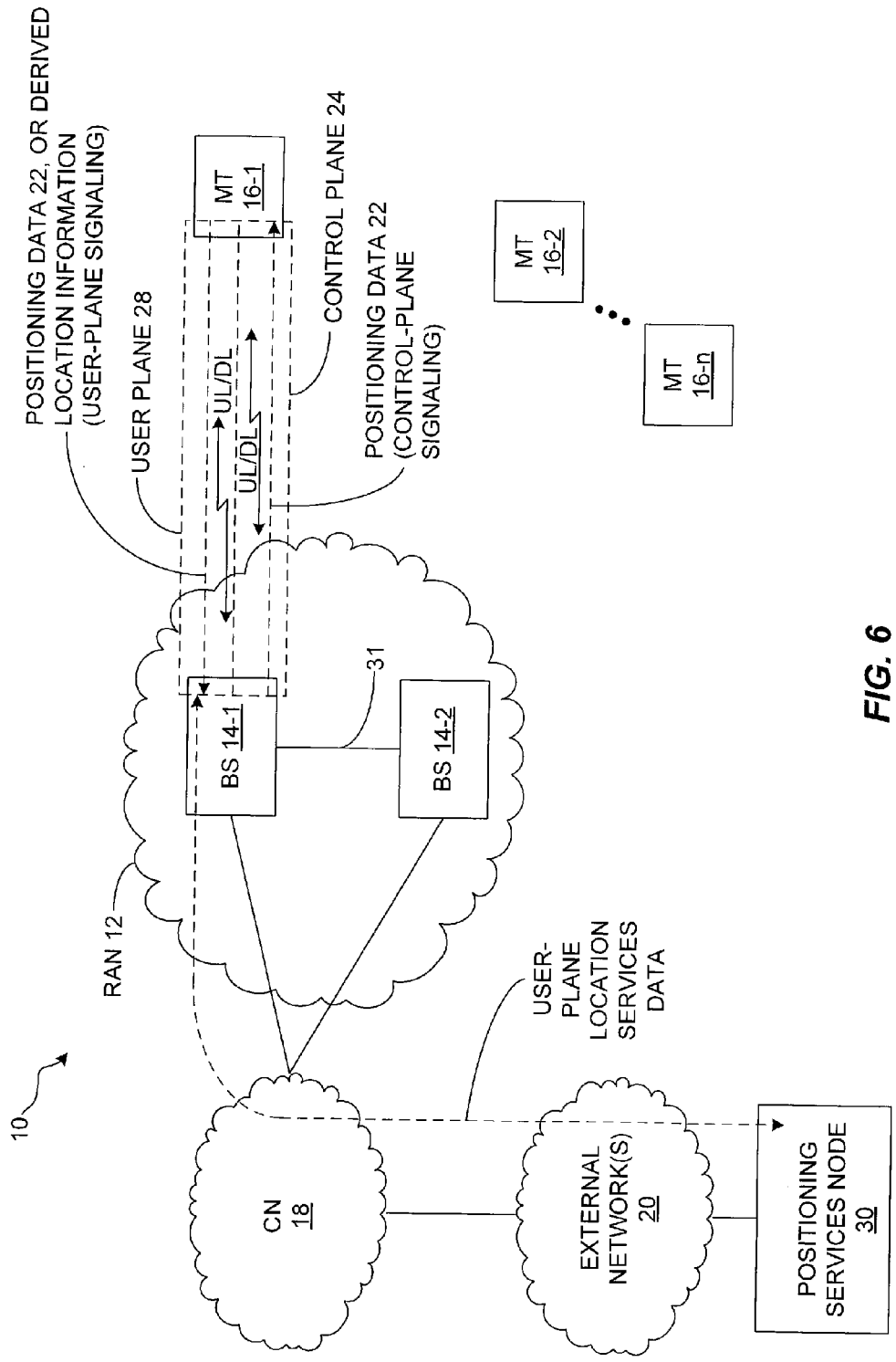
FIG. 6 is a block diagram of one embodiment of a network and an associated mobile terminal that are adapted for a hybrid location process that makes network-determined and control-plane signaled positioning data available to a user-plane node connected to the mobile terminal.

FIG. 6 illustrates an example wireless communication network 10 that includes a Radio Access Network (RAN) 12 having base stations 14-1, 14-2, etc., that wirelessly couple one or more mobile terminals 16-1, 16-2, etc., to a Core Network (CN) 18. In turn, the CN 18 communicatively couples the mobile terminals 16 to one or more external network(s) 20, e.g., the Internet. With this arrangement, any given mobile terminal 16 can be communicatively coupled to another mobile terminal 16 within the network 10 and/or to any range of communication devices, systems, and servers that are communicatively linked to the CN 18, such as through the external network(s) 20.

Of particular interest in this document, the network 10 is configured to determine positioning data 22 identifying the location of a given mobile terminal 16, in response to a receiving a positioning event trigger, and to transmit the positioning data 22 to that given mobile terminal 16 via control-plane signaling over a "control plane" 24. Advantageously, the given mobile terminal 16 is configured to internally transfer the received positioning data 22 from a control-plane function to a user-plane function, e.g., a location services application running within the terminal 16. Further, the given mobile terminal 16 is configured to transmit the positioning data 22, or location information derived from the positioning data 22, to the network 10 via user-plane signaling over a "user plane" 28.

Thus, the mobile terminal 16 transmits on the user plane 28 positioning data that is the same as the positioning data 22 received via downlink control-plane signaling, or which may be location information derived from the received positioning data 22. In turn, "derived location information" may be the positioning data 22, as supplemented with additional information from the mobile terminal 16, or it may be geographic location data computed from the positioning data 22 (in cases where the positioning data 22 does not already comprise computed geographic location data).

In any case, the positioning data 22 or derived location information is carried transparently by the network 10, as user traffic, and is thus directed to a node or other entity having a user-plane connection to the mobile terminal 16. As a particular example, a positioning services node 30 may be assumed to have a user-plane communication link to the mobile terminal 16-1, as supported by the CN 18 and the base station 14-1 within the RAN 12, acting as the serving base station for the mobile terminal 16-1. As non-limiting examples, the positioning services node 30 may be third-party retail or advertising server that provides location-based offers to a user of the mobile terminal 16-1, or it may be an emergency or law-enforcement server that is authorized to obtain location information for the mobile terminal 16-1.

In any case, the positioning services node 30, the mobile terminal 16-1, or another entity not illustrated, initiates a positioning event for the mobile terminal 16-1 and the network 10 receives a corresponding positioning event trigger. That trigger is directly or indirectly received at the serving base station 14-1, which determines positioning data 22 for the mobile terminal 16-1 in response to the trigger, and sends it to the mobile terminal 16-1 over the control plane 24.

The mobile terminal 16-1 receives the positioning data 22 via control-plane signaling, and internally transfers it to a user-plane function, e.g., a location service application running in on the user-plane side of the mobile terminal 16-1. The mobile terminal 16-1 then transmits the positioning data 22 or derived location information to the serving base station 14-1 via user-plane signaling over the control plane 28, for transport through the network 10 and external network(s) 20 as user traffic, for delivery to the positioning services node 30.

Note that the serving base station 14-1 in one or more embodiments determines the positioning data 22 for the mobile terminal 16-1 based on measuring angle-of-arrival at one or more of its antenna elements, for uplink signals from the mobile terminal 16-1. Those measurements and location information for the serving base station 14-1 can be combined with like measurements and location information from one or more neighboring base stations 14, as received by the serving base station 14-1 via an inter-base station signaling interface 31, to determine the positioning data 22. Alternatively, the serving base station 14-1 uses its angle-of-arrival measurements to establish the direction to the mobile terminal 16-1, and uses round-trip-timing (radio signal timing advance) measurements to determine the distance to the mobile terminal 16-1, meaning that it does not need to receive angle-of-arrival measurements from any neighboring base stations 14 for determining the position of the mobile terminal 16-1.

Those skilled in the art will appreciate that each base station 14 includes communication transceiver circuits—not explicitly shown in the illustration—supporting wireless communications with the mobile terminals 16. (In this document, "base station 14" and "base stations 14" are singular and plural references to any given network base station or stations, and "mobile terminal 16" and "mobile terminals 16" are singular and plural references to any given mobile terminal or terminals.)

More particularly, as mentioned earlier, downlink and uplink signaling between the base stations 14 and the mobile terminals 16 includes both control-plane signaling over the control plane 24, and user-plane signaling over the user plane 28. The control and user planes 24 and 28 will be understood as logical/functional constructs defined by their usage and associated signaling and controls. The user plane 28 provide user-to-user data transfer—i.e., bearing user data traffic transparently through the network 10 between any given mobile terminal 16 and another user, which may be external to the network 10. Conversely, while the user plane 28 is associated with carrying and controlling user traffic, the control plane 24 is associated with call control, connection control, and essentially all other aspects of network signaling and control.

Thus, signaling over the control plane 24 provides for call setup and control with respect to the mobile terminals 16, while signaling over the user plane 28 provides for traffic flow into and out of given mobile terminals 16, as carried by the network 10. Of particular interest herein, the control plane 24 is used to transmit network-calculated positioning data 22 for a given mobile terminal 16, and that mobile terminal 16 is operatively adapted to transmit that positioning data 22, or location information derived from that positioning data 22, on the user plane 28.

With this arrangement, network-derived positioning information is sent to the given mobile terminal 16 via control-plane signaling, but is made available at the terminal as user traffic. As such, that information can be transparently and flexibly carried by the network 10 to essentially any type of device, system, or server that can establish a user-plane traffic connection with the given mobile terminal 16. Such operations contrast markedly with known approaches to location-based services (LBS), which segregate LBS into either control-plane operations or user-plane operations. That is, with control-plane based LBS, positioning events and related positioning data signaling are initiated and conducted over the network's control plane, and, with user-plane based LBS, positioning events and the resultant positioning data transfers occur over the user plane.

Figure 7:
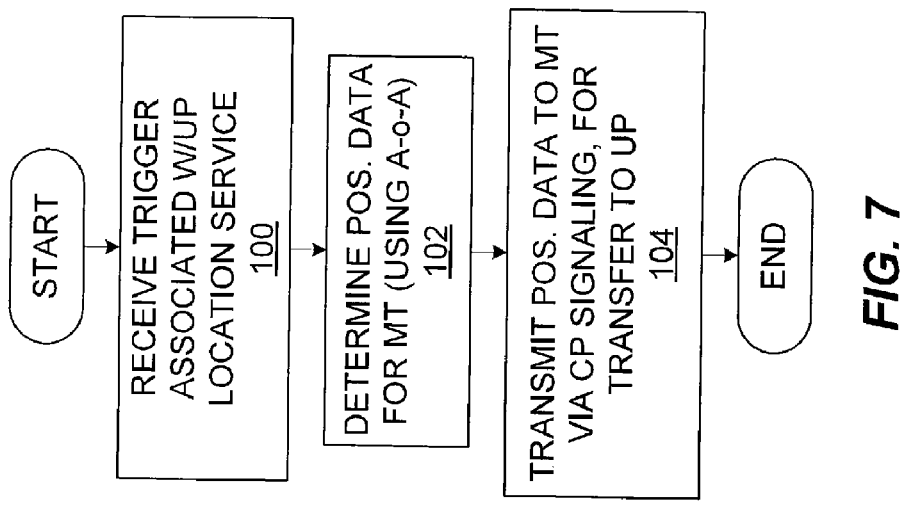
FIG. 7 is a logic flow diagram of one embodiment of a method of network-side processing for generating and signaling positioning data in the control plane, for user plane usage by a targeted mobile terminal.

FIG. 7 illustrates one embodiment of the network-side of the hybrid positioning method contemplated in this document. With example references to the network 10, the base station 14-1, and the mobile terminal 16-1, the figure illustrates a method of a wireless communication network 10 supporting a user-plane location service at a mobile terminal 16-1. The method comprises receiving a positioning request at a serving base station 14-1 in the network 10, triggered by a location request event associated with the user-plane location service (Block 100). The method further includes determining positioning data 22 for the mobile terminal 16-1, based on angle-of-arrival measurements made at one or more base stations 14, for uplink signals from the mobile terminal 16-1, and on corresponding base station location information (Block 102). Still further, the method includes transmitting the positioning data 22 from the serving base station 14-1 to the mobile terminal 16-1 via control-plane signaling, to support the user-plane location service at the mobile terminal 16-1 (Block 104).

In one or more embodiments, transmitting the positioning data 22 from the serving base station 14-1 comprises transmitting the positioning data 22 in one or more Radio Resource Control (RRC) messages. Further, in at least one such embodiment, the method includes including a flag in one of the one or more RRC messages, indicating that the positioning data 22 is for transfer within the mobile terminal 16-1 from the control plane 24 to the user plane 28. Further, in one or more embodiments, transmitting the positioning data 22 comprises including the positioning data 22 in one or more Information Elements (IEs), included in one or more RRC messages.

Determining the positioning data 22 comprises, in one or more embodiments, generating consolidated positioning information that includes angle-of-arrival measurements for the mobile terminal's uplink signals and base station location information, for the serving base station and one or more neighboring base stations. As such, transmitting the positioning data 22 comprises transmitting the consolidated data, or terminal location data as derived from the consolidated data, via control-plane signaling.

In another embodiment, determining the positioning data 22 comprises generating consolidated positioning information that includes angle-of-arrival measurements for the mobile terminal's uplink signals at the serving base station 14-1, and further includes base station location information and radio signal timing advance information or associated distance information for the mobile terminal 16-1, and wherein transmitting the positioning data comprises transmitting the consolidated data, or terminal location data as derived from the consolidated data, via control-plane signaling.

Determining the positioning data 22 in another embodiment includes measuring angle-of-arrival at the serving base station 14-1 for uplink signals received from the mobile terminal 16-1, receiving additional angle-of-arrival measurements from one or more neighboring base stations 14, and including the angle-of-arrival measurements in the position data 22, along with corresponding base station location information, for downlink transmission to the mobile terminal 16-1 via control-plane signaling.

The base station 14-1 will be appreciated as having significant computing and signal processing resources, and thus will be understood as having microprocessors or other configurable digital processing elements that are specially adapted through hardware, software, or some combination thereof, to carry out the above-described processing. In this regard, it should be appreciated that such configuration adapts the base station 14-1 as a machine particularly configured to support the hybrid control/user plane positioning operations taught herein.

This configuration may be achieved, for example, by provisioning the base station 14-1 with computer program instructions, such as stored on a disc or other computer-readable medium, whose execution by one or more digital processors in the base station 14-1 implement the described method. It will also be appreciated that the method involves the transformation of physical data inasmuch as the base station 14-1 in one or more embodiments measures received signal timing/strength for mobile terminal uplink signals, and transforms that information into positioning data 22 that comprises geographic coordinate data for the mobile terminal 16-1, or comprises raw data from which the geographic coordinates can be directly derived.

Figure 8:
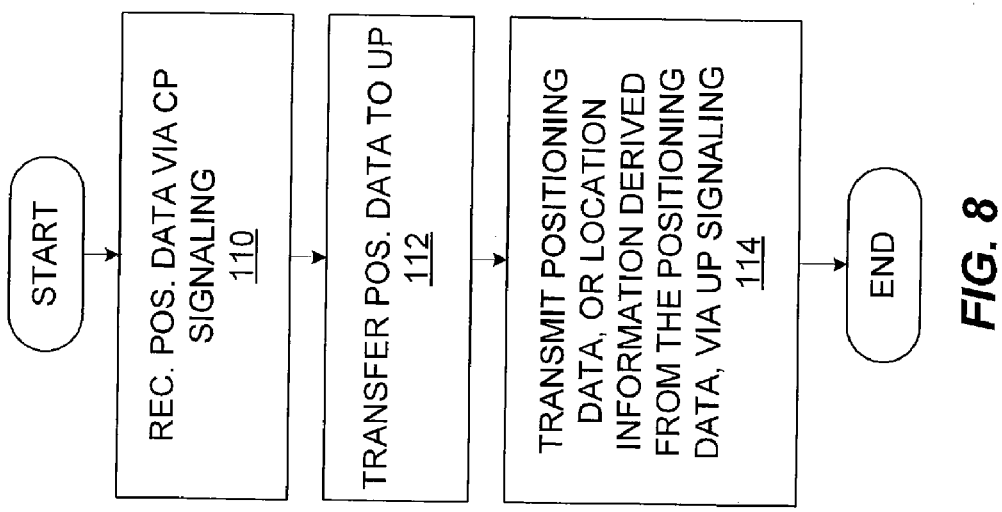
FIG. 8 is a logic flow diagram of one embodiment of a method of terminal-side processing for receiving positioning data over the control plane, and transferring it to the user plane for a user-plane location-based service.

Turning to hybrid control/user plane positioning from the perspective of the mobile terminal, and with example references to the network 10 and a given mobile terminal 16, FIG. 8 illustrates a method a method of carrying out a user-plane location service in a mobile terminal supported by a wireless communication network. The method comprises receiving—at the mobile terminal 16—positioning data 22 via control-plane signaling from the wireless communication network 10 (Block 110). That positioning data 22 is determined by the wireless communication network 10 for the mobile terminal 16 using any one or more of the network-based techniques described herein.

The method further includes transferring the positioning data 22 from a control-plane function of the mobile terminal 16 to a user-plane function of the mobile terminal 16 (Block 112). Still further, the method includes transmitting the positioning data 22, or location information derived from the positioning data 22, from the mobile terminal 16 to the wireless communication network 10 via user-plane signaling (Block 114). This can be understood as the mobile terminal 16 transmitting via uplink signaling on the user plane 28 the same positioning data 22 that it received via downlink signaling on the control plane 24, or processing or otherwise adding to that positioning data 22, and sending that information as derived location information. In either case, such transmission supports the user-plane location service, by providing the positioning data 22 or derived location information as user traffic that is carried transparently by the network 10.

With respect to the above mobile terminal processing, receiving the positioning data 22 in one or more embodiments comprises receiving the positioning data 22 in one or more Radio Resource Control (RRC) messages sent from a serving base station 14 in the wireless communication network 10 to the mobile terminal 16. In at least one such embodiment, the method includes identifying one or more Information Elements (IEs) in the one or more RRC messages as positioning data IEs, and correspondingly extracting the positioning data 22 from the one or more positioning data IEs.

Further, in at least one embodiment, transferring the positioning data 22 comprises the terminal's control-plane function saving the positioning data 22 into a memory—within the terminal—that is shared with or otherwise accessible by the user-plane function. As noted, the positioning data 22 comprises either raw positioning data or correspondingly derived location data. That is, the network 10 gives the mobile terminal 16 the raw data needed to calculate the terminal's geographic location, or it gives that location directly to the terminal. (The computed location may be thought of as "processed" or "finished" positioning data.) Further, the terminal either passes on the received positioning data 22, after whatever formatting is needed for transmission on a traffic bearer, or it processes that positioning data 22 to derive finished positioning data, and transmits the positioning data 22 or derived location information over the user plane 28.

Thus, it will be appreciated that the positioning data 22 generated by the network 10 and received at the mobile terminal 16 comprises raw positioning data in one embodiment. In at least one embodiment, receiving the positioning data 22 comprises receiving angle-of-arrival measurements and corresponding base station location information, for one or more base stations 14 in the wireless communication network 10 that measured angle-of-arrival for uplink signals from the mobile terminal 16. Here, receiving the base station location information comprises, for example, receiving base station IDs, which map to known geographic locations of the one or more base stations 14, or receiving geographic location data for the one or more base stations 14. In one or more other embodiments, receiving the positioning data 22 comprises receiving angle-of-arrival measurements and corresponding base station location information, from a serving base station 14 in the wireless communication network 10 that measured angle-of-arrival for uplink signals from the mobile terminal 16, along with receiving radio signal timing advance information from the serving base station 14.

In any case, transmitting the positioning data 22 or derived location information comprises transmitting such information from the mobile terminal 16 to the wireless communication network 10 on a shared or dedicated uplink traffic channel, for transfer to a location-services entity having a user-plane communication link with the mobile terminal 16 over the user plane 28. For example, the mobile terminal 16 has a user-plane communication link to the positioning services node 30, as shown in FIG. 6, and the mobile terminal 16 transmits the positioning data 22 or the location information derived from the positioning data 22 as user traffic. It will be appreciated that the mobile terminal 16 may be running a location services application and that the positioning services node 30 may interact with the terminal's location services application. It will also be appreciate that the particular uplink traffic bearers used to transmit from the mobile terminal on the uplink over the user plane 28 will depend on the current radio configuration of the mobile terminal 16, and, more generally, on the architecture and air interface protocols implemented by the network 10.

Figure 9:
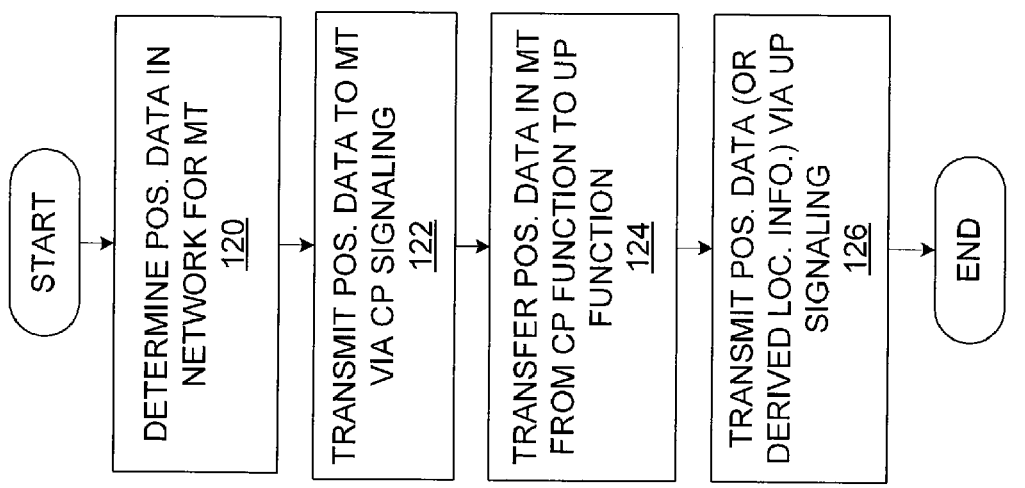
FIG. 9 is a logic flow diagram of one embodiment of network-side and terminal-side processing for the hybrid location process contemplated herein.

With the above example base station and mobile terminal processing and configurations in mind, it will be understood that a network base station and mobile terminal cooperatively interact to make network-derived and control-plane signaled positioning data available to a user-plane location service. As an example of this cooperative processing, FIG. 9 depicts one embodiment of a method of using network-generated positioning data to enable a user-plane location service in a mobile terminal.

The illustrated method comprises determining positioning data 22 in a network 10, for a mobile terminal 16 (Block 120). For example, the network determines by positioning data 22 for the mobile terminal 16 by measuring angle-of-arrival for uplink signals from the mobile terminal 16, as received at one or more network base stations 14. The method continues with transmitting the positioning data 22 from the network 10 to the mobile terminal 16 over a control-plane connection between the network 10 and the mobile terminal 16 (Block 122).

Once that positioning data 22 is received at the targeted mobile terminal 16, the mobile-side of the method continues with transferring the positioning data 22 within the mobile terminal 16 from a control-plane function to a user-plane function that is associated with or otherwise supports the user-plane location services (Block 124). The method continues with transmitting the positioning data 22, or transmitting location information derived from the positioning data 22, from the mobile terminal 16 to the network 10 over a user-plane connection between the mobile terminal 16 and the network 10 (Block 126). Thus, the user-plane location information transmitted by the mobile terminal 16 comprises or is derived from the positioning data 22 received over the control-plane connection.

Figure 10:
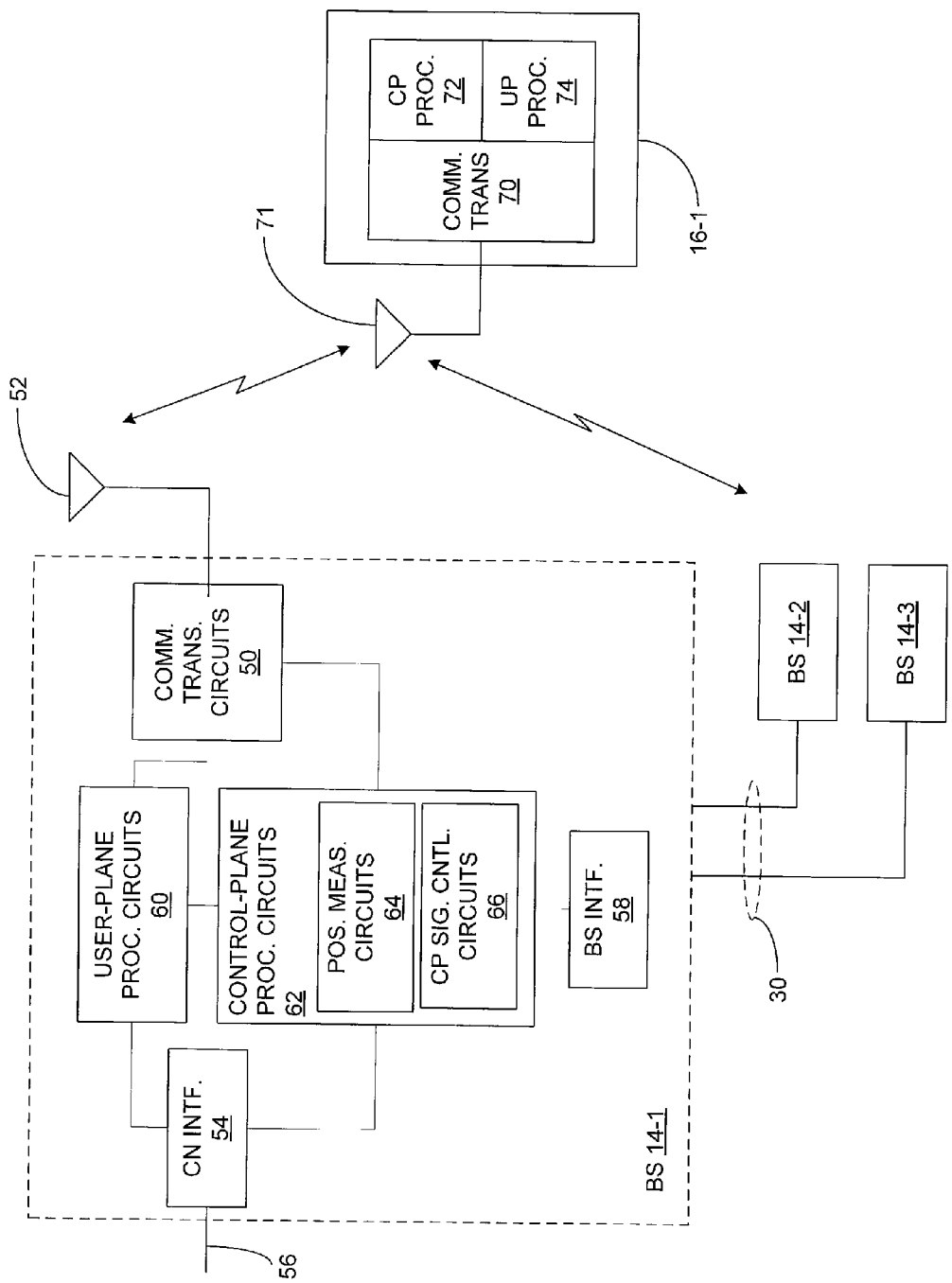
FIG. 10 is a block diagram of an LTE embodiment for a network base station and a mobile terminal that are configured for the hybrid location process contemplated herein.

To better understand the above complementary network-side and mobile-side processing, FIG. 10 provides an example block diagram illustrating functional processing circuits according to a non-limiting embodiment of the base station 14-1 and the mobile terminal 16-1. It will be appreciated that these functional circuits may correspond to physical circuit implementations, or may represent functional processing elements within aggregated microprocessor/DSP-based processing circuits.

The base station 14-1 includes communication transceiver circuits 50, and one or more transmit/receive antennas 52, for uplink/downlink communications with the mobile terminals 16. In LTE embodiments, for example, the communication transceiver circuits 50 comprise Orthogonal Frequency Division Multiplexing (OFDM) receivers and transmitters. The base station 14-1 further includes a CN interface circuit 54 for communicatively linking to the CN 18 via a CN interface 56, and an inter-base station interface circuit 58, for communicatively linking to other base stations 14 via the inter-base station signaling interface 31.

Further, the base station 14-1 includes user-plane processing circuits 60, representing functional processing circuits associated with processing, formatting, and conveying user traffic received from the CN 18 to targeted mobile terminals 16, and in conveying user traffic from those mobile terminals 16 to the CN 18, for transfer to other users within the network 10 and/or to users external to the network 10, such as users communicatively linked via the one or more external networks 20.

Still further, the base station 14-1 includes control-plane processing circuits 62, operatively configured to provide control-plane processing and signaling, as needed for call setup, call control, etc., to support and control communications within the network 10. Functionally, the control-plane processing circuits 62 include position measurement circuits 64, e.g., angle-of-arrival measurement circuits that are configured to receive or otherwise derive angle-of-arrival measurements for uplink signals impinging on the antennas 52 from any given mobile terminal 16. The control-plane processing circuits 62 further include control-plane signaling control circuits 66, including functional circuits that are operatively configured to signal the aforementioned positioning data 22 for a targeted mobile terminal 16-1. The control-plane processing circuits 62 also will be understood as being configured to generate the positioning data 22 in response to receiving a positioning trigger, which may be received from a mobile terminal 16-1, from another base station 14, or from/through the CN 18.

The mobile terminal 16-1 as illustrated comprises a communication transceiver circuit 70, which is associated with transmit/receive antenna(s) 71 and is compatible with the air interface provided by the network 10. The transceiver circuit 70 thus provides for uplink signal transmission, and downlink signal reception. The mobile terminal 16-1 further includes control plane (CP) processing circuits 72 and user plane (UP) processing circuits 74, for handling control-plane and user-plane processing, respectively.

The control plane processing and user plane processing may be divided, for example, between different processing sub-systems within the mobile terminal 16-1, such as where a modem processor associated with the communication transceiver 70 processes received control-plane signaling and generates outgoing control-plane signaling, as needed for connection and control with the network 10. The modem processor also may be responsible for passing user-plane data between the network 10 and user-plane processing elements within the mobile terminal 16-1. Such user-plane processing elements may comprise, for example, user-plane applications hosted within an operating system implemented by a systems processor of the mobile terminal 16-1.

Figure 11:
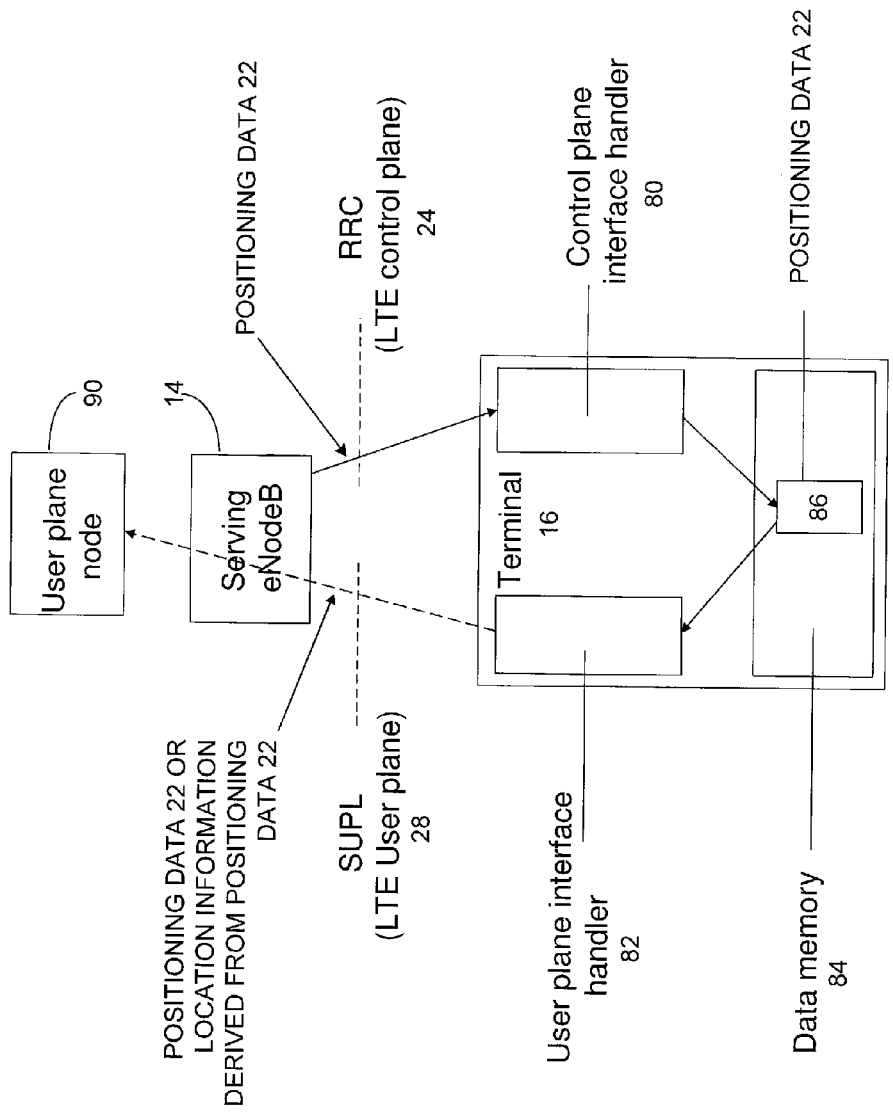
FIG. 11 is a block diagram of additional mobile terminal implementation details, for an embodiment of the hybrid location process contemplated herein.

FIG. 11 illustrates an example terminal implementation in more detail. The mobile terminal 16 includes a control-plane function, e.g., a control-plane interface handler 80, and a user-plane function, e.g., a user-plane interface handler 82. The control-plane interface handler 80 receives the positioning data 22 from a supporting base station 14 in the network 10, which may be an eNodeB in LTE embodiments. The mobile terminal 16 includes data memory 84, including a given memory storage location 86 (may be a defined memory range), which is shared between the control-plane interface handler 80 and the user-plane interface handler 82, or at least is accessible for writing by the control-plane interface handler 80 and reading by the user-plane interface handler 82.

With this arrangement, the control-plane interface handler 80 receives the positioning data 22 from the base station 14 via control-plane signaling over the control plane 24, and transfers that received data to the memory storage location 86. The user-plane interface handler 82 reads that data from the memory storage location 86 and then sends it (or location information derived from it) to a user plane node 90, as user traffic that is carried transparently through the base station 14/network 10. The user plane node 90 may be any communication device, system, or server, in or outside of the network 10, such as the positioning services node 30 shown in FIG. 6, having a user-plane communication link to the mobile terminal 16.

In this regard, it should be appreciated that such a configuration adapts the mobile terminal 16 as a machine particularly configured to support the hybrid control/user plane positioning operations taught herein. This configuration may be achieved, for example, by provisioning the mobile terminal 16 with computer program instructions, such as stored in FLASH, EEPROM, or other non-volatile memory functioning as a computer-readable medium, whose execution by one or more digital processors in the mobile terminal implement the described method. It will also be appreciated that the method involves the transformation of physical data inasmuch as the mobile terminal receives positioning data 22 and processes that data for transmission over the user plane 28. That is, the mobile terminal 22 sends the positioning data 22 as received (subject to whatever formatting or other arranging is needed for transmission on the user plane), or the mobile terminal 22 sends location information derived from the received positioning data 22. Note that these teachings also contemplate the option that the mobile terminal sends the positioning data 22, along with supplemental information.

Continuing with example embodiments having a particular focus on LTE implementations, base stations are referred to as eNodeBs, and it will be assumed that the particular eNodeBs and mobile terminals being discussed are configured for the hybrid control-plane/user-plane location processing described herein.

Enabling of AoA Only Positioning Over the User Plane of LTE

In order to obtain a position fix in this case signaling is required of: measured angle of arrival; possibly eNodeB ID, or cell ID; possibly eNodeB coordinates (latitude, longitude, altitude); and possibly time of measurement. Such signaling is done from at least one eNodeB, not being the serving eNodeB, to the serving eNodeB of the terminal, over the X2 interface, as well as over the RRC DL interface of the LTE system, from the serving eNodeB to the served terminal. The signaling and information elements constitute a first aspect of the invention disclosed herein.

In addition, the terminal needs to make the above information available for user plane signaling from the terminal. This involves a data transfer step from the receiving end of the RRC interface to the transmitting (UL) end of the user plane signaling interface. These terminal aspects constitute a second aspect of the invention disclosed herein.

In addition, in order to make the above information available in the positioning node, signaling is required of: measured angle of arrival; possibly eNodeB ID, or cell ID; possibly eNodeB coordinates (latitude, longitude, altitude); and possibly time of measurement. Such signaling is from the terminal to the positioning node, over the user plane interface of the LTE system. This signaling constitutes a third aspect of the invention disclosed herein.

Alternative—Position Calculation in the Serving eNodeB

In this alternative, the position fix (latitude, longitude, (altitude)) is computed in the eNodeB by triangulation. The so computed position then replaces the signaling from the serving eNodeB to the terminal and from the terminal to the positioning node over the user plane of LTE.

Alternative—Position Calculation in the Terminal

In this alternative, the position fix (latitude, longitude, (altitude)) is computed in the terminal by triangulation. The so computed position then replaces the signaling from the terminal to the positioning node over the user plane of LTE.

Enabling AoA and TA Positioning Over the User Plane of LTE

As was noted earlier herein, in one or more embodiments, the eNodeB can signal various positioning-related information to the terminal over the RRC DL interface. Such items include one or more of: measured angle of arrival; eNodeB ID, or cell ID; eNodeB coordinates (latitude, longitude, altitude); and time of measurement. In turn, the terminal can send all or some of this information to a positioning node, via user-plane signaling. Further, as the terminal has a TA value, it can augment the signaling it sends to the positioning node with that TA value. This augmented signaling constitutes a fourth aspect of the invention disclosed herein.

Alternatively, the signaling from the serving eNodeB to the terminal over the RRC DL interface of LTE as described above is augmented with a TA value, said TA value being obtained on request closely in time to the AoA measurements. This constitutes a fifth aspect of the invention disclosed herein. Further, as a sixth aspect of the invention, the terminal transfers the TA value received from the eNodeB (via control plane signaling) from its receiving end of the RRC DL interface to its transmitting (UL) end of the user plane signaling interface. That is, the TA value signaled from the eNodeB replaces the TA value signaled by the terminal to the positioning node.

Alternative—Position Calculation in the Serving eNodeB

In this alternative, the position fix (latitude, longitude, (altitude)) is computed in the eNodeB by triangulation, using also one of the TA values described immediately above. The correspondingly computed position then replaces the signaling from the serving eNodeB to the terminal, and from the terminal to the positioning node over the user plane of LTE. This constitutes a seventh aspect of the invention disclosed herein.

Alternative—Position Calculation in the Terminal

In this alternative, the position fix (latitude, longitude, (altitude)) is computed in the terminal by triangulation, using also any of the TA values described for "Enabling AoA and TA positioning over the user plane of LTE" elsewhere in this document. The so computed position then replaces the signaling from the terminal to the positioning node over the user plane of LTE. This constitutes an eighth aspect of the invention disclosed herein.

Enabling Single Cell AoA and TA Positioning Over the User Plane of LTE

This variant is the preferred embodiment. It is based only on measurements of the serving cell—hence no X2 signaling is needed. In a first embodiment signaling is required over the RRC DL interface of LTE of: measured angle of arrival; possibly eNodeB ID, or cell ID; possibly eNodeB coordinates (latitude, longitude, (altitude)); and possibly time of measurement. Such signaling is from the serving eNodeB to the terminal. (Note that TA is available in the terminal.) The signaling and information elements constitute a ninth part of the invention.

In addition, the terminal needs to make the above information available for user plane signaling from the terminal. This involves a data transfer step from the receiving end of the RRC interface to the transmitting (UL) end of the user plane signaling interface. In addition to this the TA value available in the terminal needs to be made available for signaling. These terminal aspects constitute a tenth part of the invention.

Further, in order to make the above information available in the positioning node, signaling is required of: measured angle of arrival; TA; possibly eNodeB ID, or cell ID; possibly eNodeB coordinates (latitude, longitude, altitude); and possibly time of measurement. Such signaling is from the terminal to the positioning node, over the user plane interface of the LTE system. This signaling constitutes an eleventh aspect of the invention disclosed herein.

Alternative—New TA Requested in eNodeB

Alternatively, the signaling from the serving eNodeB to the terminal over the RRC DL interface of LTE as described immediately above is augmented with a TA value, where that TA value is obtained on request closely in time to the AoA measurements. This constitutes a twelfth aspect of the invention disclosed herein.

Further, that requested, close-in-time TA value is made available at the user terminal for user plane signaling from the terminal, e.g., to an external positioning node. This involves a data transfer step of the received TA value from the receiving end of the terminal's RRC DL interface to the transmitting (UL) end of the user plane signaling interface at the terminal. As described earlier, the TA value received from the eNodeB via control plane signaling replaces the TA value maintained at the terminal, at least for purposes of signaling positioning information to the positioning node, via user-plane signaling. These terminal aspects constitute a thirteenth aspect of the invention disclosed herein.

Alternative—Position Calculated in the Serving eNodeB

In this alternative, the position fix (latitude, longitude, (altitude)) is computed in the eNodeB, fusing one AoA measurement of the serving eNodeB, with the TA value. The computed position then replaces the signaling from the serving eNodeB to the terminal and from the terminal to the positioning node over the user plane of LTE. This constitutes a fourteenth aspect of the invention disclosed herein.

Alternative—Position Calculated in Terminal

In this alternative, the position fix (latitude, longitude, (altitude)) is computed in the terminal by fusion of the AoA value of the serving eNodeB, with the TA value. The so computed position then replaces the signaling from the terminal to the positioning node over the user plane of LTE. This constitutes a fifteenth aspect of the invention disclosed herein.

Example Advantages of the Invention

As a non-limiting example of the advantages provided by the invention, as illustrated by the various embodiments detailed in this document, user plane positioning using uplink AoA measurements are enabled for LTE. Of course, the present invention is not limited by the foregoing example embodiments, or by the accompanying drawings. Rather, the present invention is limited only by the following appended claims and their legal equivalents.

What is claimed is:

1. A method of carrying out a user-plane location service in a mobile terminal supported by a wireless communication network, said method comprising:
    receiving positioning data via control-plane signaling from the wireless communication network, said positioning data determined by the wireless communication network for the mobile terminal;
    transferring the positioning data from a control-plane function of the mobile terminal to a user-plane function of the mobile terminal; and
    transmitting the positioning data, or location information derived from the positioning data, from the mobile terminal to the wireless communication network via user-plane signaling, for supporting the user-plane location service.

2. The method of claim 1, wherein receiving the positioning data comprises receiving the positioning data in one or more Radio Resource Control (RRC) messages sent from a serving base station in the wireless communication network to the mobile terminal.

3. The method of claim 2, further comprising identifying one or more Information Elements (IEs) in one or more of the RRC messages as positioning data IEs, and correspondingly extracting the positioning data from the one or more positioning data IEs.

4. The method of claim 1, wherein said transferring the positioning data comprises the control-plane function saving the positioning data into a memory that is shared with or otherwise accessible by the user-plane function.

5. The method of claim 1, wherein the positioning data comprises either raw positioning data or correspondingly derived location data.

6. The method of claim 1, wherein the positioning data comprises raw positioning data, and wherein said transmitting the positioning data, or location information derived from the positioning data, comprises deriving the location information from the raw positioning data and transmitting the location information.

7. The method of claim 1, wherein said transmitting the positioning data, or location information derived from the positioning data, comprises transmitting the positioning data or location information from the mobile terminal to the wireless communication network on a shared or dedicated uplink traffic channel, for transfer to a location-services entity having a user-plane communication link with the mobile terminal over the user plane.

8. The method of claim 1, wherein said receiving the positioning data comprises receiving angle-of-arrival measurements and corresponding base station location information, for one or more base stations in the wireless communication network that measured angle-of-arrival for uplink signals from the mobile terminal.

9. The method of claim 8, wherein receiving the base station location information comprises receiving base station IDs, which map to known geographic locations of the one or more base stations, or receiving geographic location data for the one or more base stations.

10. The method of claim 1, wherein said receiving the positioning data comprises receiving angle-of-arrival measurements and corresponding base station location information, from a serving base station in the wireless communication network that measured angle-of-arrival for uplink signals from the mobile terminal, along with receiving radio signal timing advance information from the serving base station.

11. A mobile terminal configured to carry out a user-plane location service, said mobile terminal comprising:
    a communication transceiver configured to receive positioning data via control-plane signaling from a supporting wireless communication network, said positioning data determined by the wireless communication network for the mobile terminal;
    one or more processing circuits operatively associated with the communication transceiver and configured to:
        transfer the positioning data from a control-plane function of the mobile terminal to a user-plane function of the mobile terminal; and
        transmit the positioning data, or location information derived from the positioning data, from the mobile terminal to the wireless communication network via user-plane signaling, for supporting the user-plane location service.

12. The mobile terminal of claim 11, wherein the mobile terminal is configured to receive the positioning data in one or more Radio Resource Control (RRC) messages sent from a serving base station in the wireless communication network to the mobile terminal.

13. The mobile terminal of claim 12, wherein the mobile terminal is configured to identify one or more Information Elements (IEs) in one or more of the RRC messages as positioning data IEs, and correspondingly extract the positioning data from the one or more positioning data IEs.

14. The mobile terminal of claim 11, wherein the mobile terminal is configured to transfer the positioning data from the control-plane function to the user-plane function by the control-plane function saving the positioning data into a memory that is shared with or otherwise accessible by the user-plane function.

15. The mobile terminal of claim 11, wherein the positioning data comprises either raw positioning data or correspondingly derived location data.

16. The mobile terminal of claim 11, wherein the positioning data comprises raw positioning data, and wherein the mobile terminal is configured to generate the location information by deriving the location information from the raw positioning data.

17. The mobile terminal of claim 11, wherein the mobile terminal is configured to transmit the positioning data or the location information derived from the positioning data by transmitting the positioning data or the location information from the mobile terminal to the wireless communication network on a shared or dedicated uplink traffic channel, for transfer to a location-services entity having a user-plane communication link with the mobile terminal over the user plane.

18. The mobile terminal of claim 11, wherein the mobile terminal is configured to receive the positioning data as angle-of-arrival measurements and corresponding base station location information, for one or more base stations in the wireless communication network that measured angle-of-arrival for uplink signals from the mobile terminal.

19. The mobile terminal of claim 18, wherein the mobile terminal is configured to receive the base station location information as base station IDs, which map to known geographic locations of the one or more base stations, or as geographic location data for the one or more base stations.

20. The mobile terminal of claim 11, wherein said the mobile terminal is configured to receive the positioning data as angle-of-arrival measurements and corresponding base station location information, from a serving base station in the wireless communication network that measured angle-of-arrival for uplink signals from the mobile terminal, along with radio signal timing advance information from the serving base station.

21. A method of using network-generated positioning data to enable a user-plane location service in a mobile terminal, said method comprising:
    determining positioning data for the mobile terminal by measuring angle-of-arrival for uplink signals from the mobile terminal, as received at one or more network base stations;
    transmitting the positioning data from the network to the mobile terminal over a control-plane connection between the network and the mobile terminal;
    transferring the positioning data within the mobile terminal from a control-plane function to a user-plane function associated with or otherwise supporting the user-plane location services; and
    transmitting the positioning data or location information derived from the positioning data from the mobile terminal to the network over a user-plane connection between the mobile terminal and the network.

22. A method of a wireless communication network supporting a user-plane location service at a mobile terminal, said method comprising:
    receiving a positioning request at a serving base station in the network, triggered by a location request event associated with the user-plane location service;
    determining positioning data for the mobile terminal based on angle-of-arrival measurements made at one or more base stations for uplink signals from the mobile terminal, and on corresponding base station location information; and
    transmitting the positioning data from the serving base station to the mobile terminal via control-plane signaling, to support the user-plane location service at the mobile terminal.

23. The method of claim 22, wherein transmitting the positioning data from the serving base station comprises transmitting the positioning data in one or more Radio Resource Control (RRC) messages.

24. The method of claim 23, further comprising including a flag in one or more of the RRC messages, indicating that the positioning data is for transfer within the mobile terminal from the control plane to the user plane.

25. The method of claim 22, wherein transmitting the positioning data comprises including the positioning data in one or more Information Elements (IEs), included in one or more of the RRC messages.

26. The method of claim 22, wherein determining the positioning data comprises generating consolidated positioning information that includes angle-of-arrival measurements for the mobile terminal's uplink signals and base station location information, for the serving base station and one or more neighboring base stations, and wherein transmitting the positioning data comprises transmitting the consolidated data, or terminal location data as derived from the consolidated data, via control-plane signaling.

27. The method of claim 22, wherein determining the positioning data comprises generating consolidated positioning information that includes angle-of-arrival measurements for the mobile terminal's uplink signals at the serving base station, and further includes base station location information and radio signal timing advance information or associated distance information for the mobile terminal, and wherein transmitting the positioning data comprises transmitting the consolidated data, or terminal location data as derived from the consolidated data, via control-plane signaling.

28. The method of claim 22, wherein determining the positioning data includes measuring angle-of-arrival at the serving base station for uplink signals received from the mobile terminal, receiving additional angle-of-arrival measurements from one or more neighboring base stations, and including the angle-of-arrival measurements in the position data, along with corresponding base station location information, for downlink transmission to the mobile terminal via control-plane signaling.

29. A base station configured to support a user-plane location service at a mobile terminal, said base station comprising one or more processing circuits configured to:
    receive a positioning request at the base station, triggered by a location request event associated with the user-plane location service;
    determine positioning data for the mobile terminal based on angle-of-arrival measurements made at one or more base stations for uplink signals from the mobile terminal, and on corresponding base station location information; and
    transmit the positioning data from the base station to the mobile terminal via control-plane signaling, to support the user-plane location service at the mobile terminal.

30. The base station of claim 29, wherein the base station is configured to transmit the positioning data in one or more Radio Resource Control (RRC) messages.

31. The base station of claim 30, wherein the base station is configured to include a flag in one or more of the RRC messages, indicating that the positioning data is for transfer within the mobile terminal from the control plane to the user plane.

32. The base station of claim 29, wherein the base station is configured to transmit the positioning data in one or more Information Elements (IEs), included in one or more of the RRC messages.

33. The base station of claim 29, wherein the base station is configured to determine the positioning data by generating consolidated positioning information that includes angle-of-arrival measurements for the mobile terminal's uplink signals and base station location information, for the base station and one or more neighboring base stations, and to transmit the consolidated data, or terminal location data as derived from the consolidated data, via control plane signaling.

34. The base station of claim 29, wherein the base station is configured to determine the positioning data by generating consolidated positioning information that includes angle-of-arrival measurements for the mobile terminal's uplink signals at the base station, and further includes base station location information and radio signal timing advance information or associated distance information for the mobile terminal, and wherein transmitting the positioning data comprises transmitting the consolidated data, or terminal location data as derived from the consolidated data, via control-plane signaling.

35. The base station of claim 29, wherein the base station is configured to determine the positioning data by measuring angle-of-arrival at the base station for uplink signals received from the mobile terminal, receiving additional angle-of-arrival measurements from one or more neighboring base stations, and including the angle-of-arrival measurements in the position data, along with corresponding base station location information, for downlink transmission to the mobile terminal via control-plane signaling.

* * * * *